United States Patent Office 2,786,828
Patented Mar. 26, 1957

2,786,828

NEUTRALIZATION OF FRIEDEL-CRAFTS CATALYST

Helmuth G. Schneider, Westfield, N. J., and William C. Van Siclen, Brea, Calif., assignors to Esso Research and Engineering Company, a corporation of Delaware No Drawing. Application December 27, 1955,
Serial No. 555,262

4 Claims. (Cl. 260—94.8)

This invention relates to an improved method for the destruction of catalyst residues and relates more particularly to the destruction of residues of Friedel-Crafts catalysts, such as aluminum chloride, used in the polymerization of various types of unsaturated hydrocarbons and is a continuation-in-part of application Serial No. 316,556, filed October 23, 1952.

Many types of hydrocarbon polymerizations employ metal halides of the Friedel-Crafts type as catalysts. Among these polymerizations is the polymerization of iso-olefins, such as isobutylene, to solid rubbery polymers. Aluminum chloride is the most generally used of the Friedel-Crafts catalysts, but aluminum bromide, titanium tetrachloride and zirconium tetrachloride are used also. At the end of the reaction the catalyst must be destroyed to prevent further polymerization.

At the end of the reaction the product must be treated to destroy residual catalyst and to prevent the product from going off color. It is known that a good proportion of the catalyst is actually bound up with the polymer, i. e. it terminates the polymer chain. If this catalyst is not released from the polymer and destroyed the resulting product is so color unstable as to be unmarketable. Various materials have been used for this purpose. For example, alcohols, such as methanol and ethanol and alkalis such as sodium hydroxide can be used. Sodium hydroxide is used because of its convenience, ready availability, and cheapness. However, it has been considered necessary to use a large excess of the caustic in order to completely eliminate the catalyst. This in turn requires further washing to remove the excess caustic from the polymer. This excessive washing results in the formation of emulsions which are difficult to break. Furthermore the use of strong caustic causes the resulting polymer to lose color stability.

The present invention provides an improved process for the polymerization of polymerizable organic compounds catalyzed by a metallic halide and the like. It provides an improved process particularly applicable to the polymerization of an isoolefin wherein the process can be carried out without the above difficulties.

It is therefore the major object of the present invention to provide a method for effectively destroying the catalyst used in the polymerization of isoolefins.

In accordance with this invention, this and other objects of the invention are accomplished by adding 0.5 to 3 volumes of aqueous caustic having a concentration between 0.1 and 1.0 wt. percent and containing 10 to 100% molar excess of sodium hydroxide to the reactor contents and allowing the mixture to stand at a temperature between 20° and 65° C. preferably 50° and 65° C., for a time sufficient to complete the reaction between the caustic and aluminum chloride or other metal halide. The use of this amount of caustic in this strength results in the use of less caustic, increases the speed of settling, prevents the formation of emulsions, results in minimum solid aluminum hydroxide formation, and gives a polymer of good color stability.

The invention is particularly adapted to processes for the polymerization of solid polymers from isobutylene or a hydrocarbon fraction containing it by contacting the isobutylene, preferably in a diluent such as hexane, with finely divided solid aluminum chloride or a slurry thereof in hexane at a temperature between −80° and +40° C. at a velocity of about five feet per second. The polymer as it forms dissolves in the large excess of hexane present in the reactor and is withdrawn as a slurry with aluminum chloride. The slurry is contacted in an orifice mixer at a temperature of 20°–65° C., preferably 50°–65° C. with an equal volume of caustic solution containing the desired molar excess of caustic between 10 and 100%. Under these conditions the amount of aluminum hydroxide precipitated is at a minimum. The mixture is allowed to settle into two layers, an upper layer consisting of a solution of polymer in hexane and a lower layer of dilute caustic containing most of the aluminum as a soluble sodium aluminate. These layers are separated and the caustic layer sent to the sewer. It is particularly important that the pH of the aqueous layer be maintained between 9.5 and 12.5 in order to secure the complete elimination of the catalyst from the polymer.

While the invention has specific practical application to the preparation of solid polymers from isobutylene, it is not limited to such processes, but finds application in all processes wherein metal halides such as aluminum chloride are used as catalysts, regardless of the product being manufactured.

The following examples illustrate the benefits to be obtained by the practice of the present invention.

Example I

A mixture of 30% isobutylene and 70% hexane was polymerized at −40° C. in the presence of finely divided aluminum chloride to give a solution of 20% polyisobutylene in hexane slurried with 0.3 wt. percent aluminum chloride. Different portions of the reactor effluent were washed at 65° C. with different volumes of dilute caustic and separately settled. The following data were obtained:

| Mol. Ratio NaOH/AlCl₃ | pH Aqueous Layer | Percent Al as insoluble Al(OH)₃, percent |
|---|---|---|
| 3 | 9.3 | 97.5 |
| 4 | 10.5 | 4.8 |
| 5 | 11.6 | 6.1 |
| 6 | 12.2 | 7.5 |

In order to maintain a pH in the range of 9.5 to 12.5 the volume ratio of aqueous caustic to polymer solution should be at least 1:1 or higher. This corresponds to a mole ratio of approximately 3.5 to 6 NaOH to AlCl₃. It can be readily seen that operating outside these ranges large amounts of insoluble Al(OH)₃ will be present causing difficulty in separation and fouling.

Example II

Other portions of the reactor contents of Example I were washed with equal volumes of caustic in which the molar excess of caustic over the aluminum chloride varied from 0 to 100%. The following data were obtained:

| | | | | |
|---|---|---|---|---|
| Percent Molar excess of NaOH over AlCl₃ | 0 | 33.3 | 66.7 | 100 |
| Percent of aluminum salts as insoluble Al(OH)₃ | 97.5 | 4.8 | 6.1 | 7.5 |

From the above data it is evident that as the excess sodium hydroxide approaches zero the insoluble aluminum hydroxide increases rapidly but from 33% to 100% excess the amount of Al(OH)₃ precipitated is very small.

Example III

Polyisobutylene was prepared as in Example I except that the process was carried out continuously. The solution of polymer in hexane was continuously washed with an equal volume of caustic containing 10% molar excess of sodium hydroxide over aluminum chloride and the mixture settled. The washed polymer was stripped of hexane and the hexane recycled to the reactor. From 93 to 98% of the aluminum salts were found in the aqueous phase by the continuous settling operation.

Example IV

In a continuous process similar to Example III with equal volume of caustic containing 100% molar excess the settling temperature was varied between 50° C. and 65° C. Analysis of the hydrocarbon phase, aqueous interface and aqueous phase for aluminum content was made to indicate the degree of separation. This is shown in the following table:

| Settling Temperature | Wt. percent Al on total Al added | | |
|---|---|---|---|
| | Hydrocarbon Phase | Aqueous Interface | Aqueous Phase |
| 50° C | 1.71 | 9.96 | 88.30 |
| 65° C | 0.28 | 2.19 | 97.53 |

Example V

In a continuous process similar to that of Example III, a lubricating oil such as Essolube 20 was added to the washed polymer solution in hexane. This material was stripped to remove the hexane and leave a solution of the polymer in oil. The effect of the strength of the caustic used in the washing step on the color stability of the hexane-free oil-polymer solution is shown in the following data:

| 1 to 1 Volume Caustic Wash | Tag Robinson Color | | | | | |
|---|---|---|---|---|---|---|
| | Initial | 8 hrs. | 16 hrs. | 24 hrs. | 32 hrs. | 40 hrs. |
| 0% excess NaOH | 9+ | 9+ | 9+ | 7¾ | 5 | 4½ |
| 250% excess NaOH | 9+ | 9+ | 9+ | 7½ | 4¼ | 4 |
| 1,250% excess NaOH | 9+ | 9+ | 9+ | 6 | 3¾ | 3½ |

From the above examples it is clear that the aluminum chloride catalyst should be washed from the polymer solution by means of an equal volume of caustic containing between 10 and 100 mol percent excess of sodium hydroxide at a temperature of 65° C.

The nature and objects of the present invention having been thus described and illustrated, what is claimed as new and useful and desired to be secured by Letters Patent is:

1. In a process for destroying residual catalyst in polymerization of isoolefins with metal halide catalysts by the addition of caustic to the reaction mixture containing residual catalyst, the improvement which comprises maintaining the reaction mixture at a pH between 9.5 and 12.5 by employing at least 0.5 to 3 volumes of dilute caustic per volume of reaction mixture, said caustic having a concentration between 0.1 and 1.0 wt. percent and containing between 10 and 100 mol percent excess of sodium hydroxide over that theoretically necessary to react with the catalyst.

2. Process according to claim 1 in which the catalyst is aluminum chloride.

3. Process according to claim 2 in which the temperature is between 50° and 65° C.

4. Process for preparing polyisobutylene which comprises contacting a mixture of 30% isobutylene and 70% hexane at −40° C. in the presence of finely divided aluminum chloride whereby a slurry of polymer in reaction liquor is formed, maintaining the slurry at a pH between 9.5 and 12.5 by washing the reactor effluent at 20°–120° C. with at least 0.5 to 3 volumes of dilute caustic per volume of reaction product said caustic having a concentration between 0.1 and 1.0 wt. percent and containing between 10 and 100 mol percent excess sodium hydroxide over that theoretically necessary to react with the catalyst.

No references cited.